United States Patent

Hirano

[11] Patent Number: 5,865,387
[45] Date of Patent: Feb. 2, 1999

[54] FISHING REEL BRAKE DEVICE PROVIDING ADJUSTABLE BRAKE FORCE THROUGH ADJUSTABLE BRAKE SHOE

[75] Inventor: Kazuo Hirano, Saitama, Japan

[73] Assignee: Daiwa Seiko, Inc., Tokyo, Japan

[21] Appl. No.: 649,499

[22] Filed: May 17, 1996

[30] Foreign Application Priority Data

May 24, 1995 [JP] Japan .................................. 7-125223

[51] Int. Cl.⁶ .................................................. A01K 89/02
[52] U.S. Cl. ...................... 242/289; 188/181 A; 188/185
[58] Field of Search ........................ 242/289; 188/181 A, 188/185

[56] References Cited

U.S. PATENT DOCUMENTS

| | | | |
|---|---|---|---|
| 2,290,662 | 7/1942 | Willison | 242/289 |
| 2,896,912 | 7/1959 | Faugier | 188/185 |
| 4,390,140 | 6/1983 | Karlsson et al. | 188/185 X |
| 5,356,090 | 10/1994 | Sato | 242/289 |

FOREIGN PATENT DOCUMENTS

| | | | |
|---|---|---|---|
| 580589 | 8/1959 | Canada | 242/289 |
| 3-79665 | 8/1991 | Japan . | |
| 5-73 | 1/1993 | Japan . | |
| 1241798 | 8/1971 | United Kingdom | 188/181 A |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

In a centrifugal force-operated brake device for a fishing reel, brake shoes (20) are slidably mounted on supporting rods (19) which are turned together with the spool. The brake shoes are brought into sliding contact with the inner cylindrical surface (15a) of a brake cylinder (15) by centrifugal force, thereby braking the spool. The supporting rods (19) are swingably supported by a supporting member (17), so that their angular position relative to the supporting member is changeable.

9 Claims, 6 Drawing Sheets

FISHING REEL BRAKE DEVICE PROVIDING ADJUSTABLE BRAKE FORCE THROUGH ADJUSTABLE BRAKE SHOE

BACKGROUND OF THE INVENTION

1. Field of the Invention

This invention relates to a brake device for a fishing reel, and more particularly to a centrifugal force-operated brake device for a fishing reel which prevents the spool from turning excessively.

2. Description of the Prior Art

In a conventional fishing reel, a spool is rotatably provided between the side boards of a reel body. As is well known in the art, to prevent the spool from turning excessively when the fishing line is let out of the reel, a centrifugal force-operated brake device is employed to brake the spool. The brake device prevents backlash, which is caused when the speed of rotation of the spool is higher than the speed at which the fishing line is let out of the reel. An example of a brake device of this type is disclosed by Japanese Patent Application (OPI) No. 73/1993 (the term "OPI" as used herein means an "unexamined published application").

The brake device thus disclosed is designed to control the movement of a brake collar by effecting a brake state wherein centrifugal force due to the rotation of the spool is utilized when the fishing line is let out of the reel, or by effecting a non-brake state in which no brake force is generated. With this brake device, the application of a brake force to the spool due to centrifugal force can be switched on and off. However, the brake force thus applied cannot be adjusted. In addition, when the fishing line is let out of the reel, it is impossible to suitably operate the reel, because factors such as the weight of the sinker being used, the flying distance to the desired fishing point, the speed of the wind, the skill of the angler, etc. cannot be taken into account.

On the other hand, Japanese Utility Patent Application (OPI) No. 79665/1991 discloses a brake device wherein a brake shoe is slidably and loosely coupled to a supporting lever which is turned together with a spool. A brake drum is also provided whose inside diameter gradually changes axially, and is axially movable with an external control. The brake shoe is brought into sliding contact with the brake drum. In this brake device, by moving the brake drum axially, the brake force applied to the spool can be adjusted (changed). Hence, this brake device is free from the above-described difficulties.

However, this brake device still has disadvantages. Firstly, since the brake drum is moved axially, the axial length of the reel body is relatively large; that is, the reel body is bulky, which adversely affects the operability of the reel. Furthermore, the diameter of the brake drum is changed by moving the latter in the axial direction. When the brake drum diameter is changed in this manner, the sliding contact position of the brake shoe with respect to the inner cylindrical surface of the brake drum is unstable, so the brake device does not have satisfactory brake characteristics. In other words, the inner cylindrical surface of the brake drum which is axially movable is tapered, and the brake shoe is brought into sliding contact with this tapered cylindrical surface. Hence, when the brake shoe is turned, the sliding contact state can become unstable.

SUMMARY OF THE INVENTION

In view of the foregoing, an object of the invention is to provide a brake device for a fishing reel in which the reel body is not bulky, yet the brake force of the spool can be controlled with high stability.

The foregoing object of the invention has been achieved by the provision of a brake device for a fishing reel in which brake shoes are slidably coupled to supporting rods which turn together with a spool which is rotatably supported between the side boards of a reel body.

The brake shoes are brought into sliding contact with the internal cylindrical surface of a brake cylinder by a centrifugal force generated in the reel body, thereby braking the spool.

In a preferred embodiment of the invention, the supporting rods on which the brake shoes are slidably mounted are swingably supported by the supporting member, which turns together with the spool such that the supporting rods are each changeable in angular position. When, during operation of the brake device, the supporting rods are supported so that they extend radially from the spool shaft, the brake force applied is strongest. By turning the supporting rods from those positions, the brake force applied to the spool can be weakened as desired.

In another preferred embodiment of the invention, the brake rods, each of which has a brake surface at its outer end which is brought into sliding contact with the inner cylindrical surface of the brake cylinder, are slidably supported by the supporting member which turns together with the spool. A weight member is mounted on each brake rod such that it is movable longitudinally on the brake rod. As the weight member is moved radially outward from the spool shaft, the centrifugal force acting on the brake rod is increased, and the brake force applied to the spool is increased.

By swinging the above-described supporting rods, or by shifting the weight members on the brake rods, the brake force acting on the spool can be adjusted.

DETAILED DESCRIPTION OF THE PREFERRED EMBODIMENTS

The preferred embodiments of this invention will be described with reference to the accompanying drawings.

Figure 1:
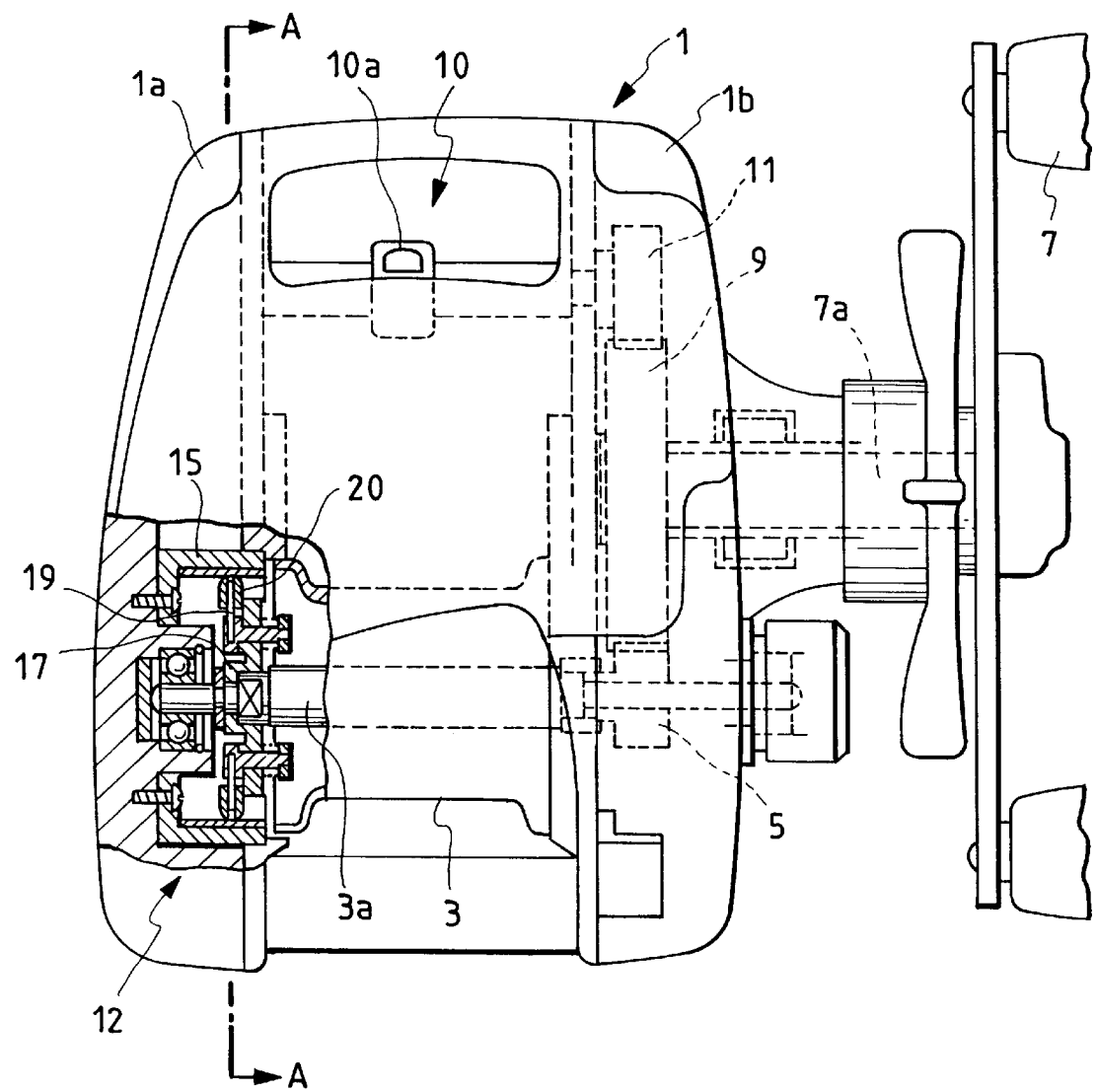
FIG. 1 is a diagram showing the arrangement of an ordinary double-bearing reel with a brake device according to the invention.
Figure 2:
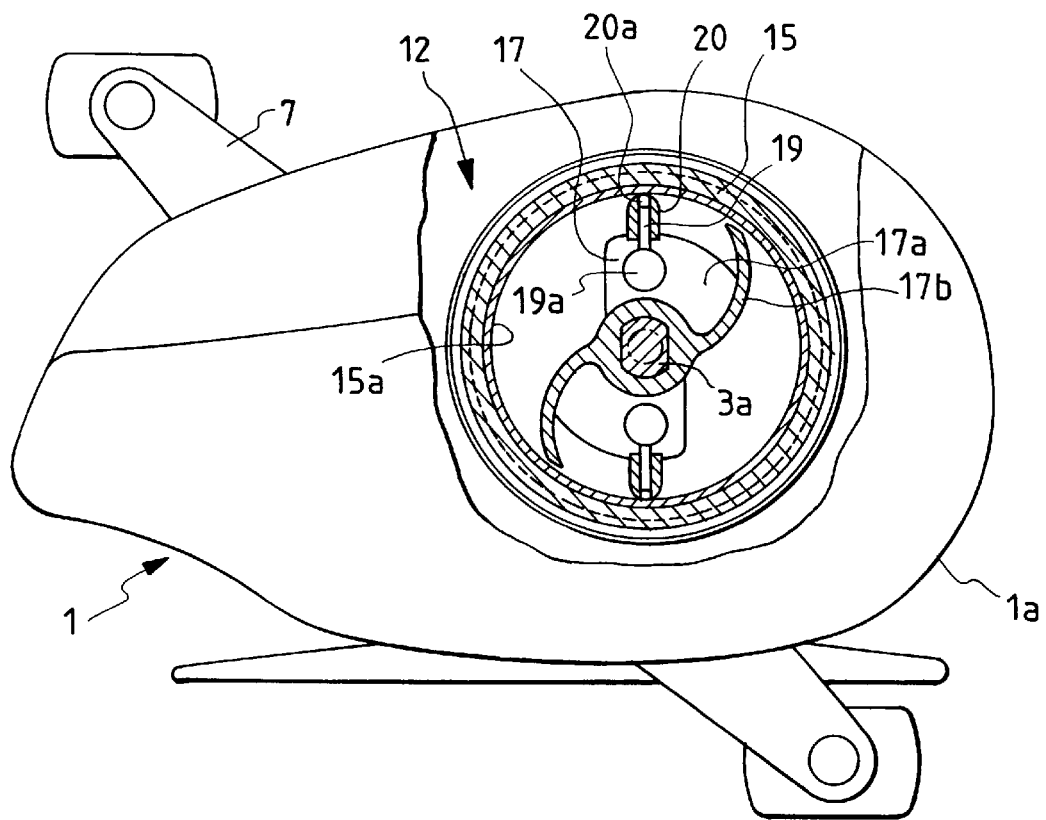
FIG. 2, is a sectional view taken along line A—A in FIG. 1.
Figure 3:
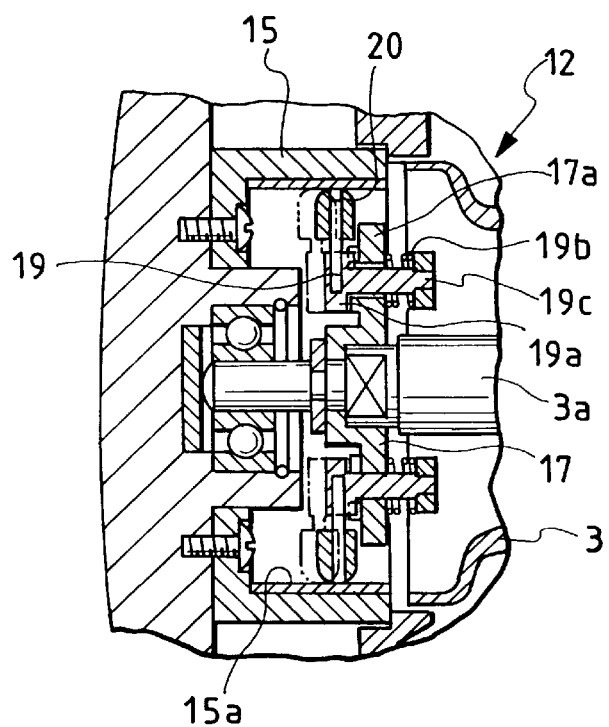
FIG. 3 is an enlarged diagram of a part of the brake device shown in FIG. 1.

A brake device for a fishing reel, which constitutes a first embodiment of the invention, will be described with reference to FIGS. 1, 2 and 3.

The reel body 1 has side boards 1a and 1b, between which a spool shaft 3a with a spool 3 is rotatably supported through bearings. A pinion 5 is mounted on the right side board 1b of the spool shaft 3a such that it is engaged with a drive gear 9 which is mounted on a handle gear 7a. The spool 3 is turned by rotating a handle 7 mounted on the handle shaft 7a. In front of the spool 3 between the right and left side boards 1a and 1b of the reel body 1, a level wind device 10 with a line lead section 10a is supported. The line lead section 10a is reciprocated between the side boards 1a and 1b by means of a gear 11 engaged with the drive gear 9, so that the fishing line is uniformly wound on the spool 3 through the line lead section 10a.

A brake device 12 is provided at the end of the left side board 1a of the spool shaft 3a. The brake device 12 comprises: a brake cylinder 15 which is secured to the inside of the side board 1a with screws or the like, and is opened towards the spool. The supporting member 17 includes a flat portion 17a which is perpendicular to the spool shaft 3a. Supporting rods 19 are supported on the flat portion 17a such that they are symmetrical with respect to the spool shaft 3a. Brake shoes 20 are slidably mounted on the supporting rods 19 such that their end faces 20a are slidable along the inner cylindrical surface 15a of the brake cylinder 15.

The aforementioned supporting rods 19 are each supported in the flat portion 17a through swing means so that their positional angle may be changed. The swing means can be formed as shown in FIG. 3. The supporting rods 19 and the flat portions 17a also comprise positioning engaging means made up of protrusions and recesses; more specifically, the protrusions and the recesses are formed in the rear surface of the base end portion 19a and the front surface of the flat portion 17a, respectively, according to predetermined control swing angles. A pin 19c with an urging spring 19b is provided to press the base end portion 19a against the elastic force of the spring 19b from the rear surface of the flat portion 17a. Thus, by pressing the pin 19c against the elastic force of the urging spring 19b as indicated by the dotted lines, the supporting rod 19 can be turned (swung) to the desired swing position. The supporting rod 19 thus swung is held there by the elastic force of the urging spring 19b.

Now, the relationships between the positions of the supporting rods 19 and the centrifugal force of the brake shoes 20 applied to the inner cylindrical surface 15a of the brake cylinder 15 will be described with reference to FIG. 4.

Figure 4:
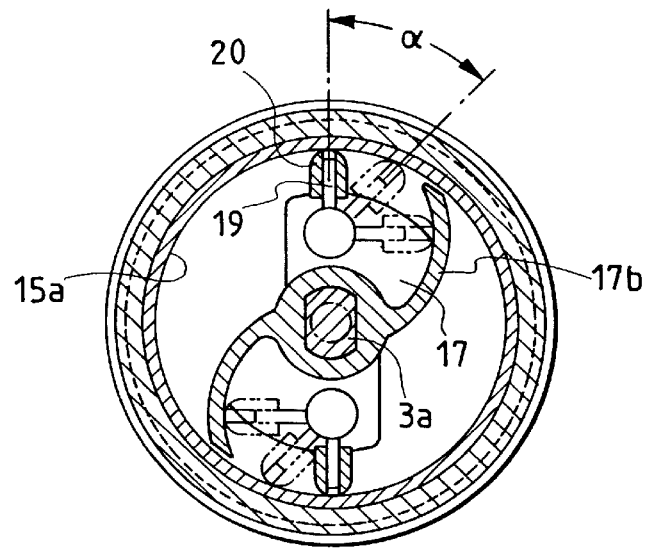
FIG. 4 is a diagram showing the relationship between the position of a supporting rod and the centrifugal force applied to the inner cylindrical surface of a brake cylinder.

When, with each rod 19 at the position indicated by the solid lines in FIG. 4, the supporting member 17 is turned at a predetermined speed, each brake shoe 20 applies a centrifugal force F to the inner cylindrical surface 15a of the brake cylinder 15. When each rod 19 is turned through a predetermined angle $\alpha$ by the aforementioned swing means, and the supporting member 17 is thereafter turned at the same predetermined speed, each brake shoe 20 applies a centrifugal force F1 to the cylindrical surface 15a. Then, an expression $F1=F \cos \alpha$ is obtained. As is apparent from the expression, the brake force applied to the spool 3 gradually decreases as the angle $\alpha$ increases. This means that the brake force applied to the spool 3 can be adjusted by changing the position of each supporting rod 19 to change the angle $\alpha$.

Each of the supporting rods 19 may have a number of positions by suitably increasing the number of the aforementioned positioning engaging means made up of the protrusions and the recesses. The end face 20a of its brake shoe 20 is brought into contact with the inner cylindrical surface 15a at different angles. Hence, preferably the end face 20a is arcuate so that it is stably brought into sliding contact with the inner cylindrical surface 15a at all swing positions thereof. In the above-described embodiment, two supporting rods 19 are provided symmetrical with respect to the spool shaft 3a; however, the invention is not limited thereto or thereby. That is, more than two supporting rods 19 may be employed. In this case, it is necessary to suitably change the configuration of the supporting member 17, and the positions of the supporting rods 19 so that the brake forces are uniformly applied to the spool 3, with the direction of rotation of the spool shaft 3 taken into account. In the above-described embodiment, the supporting member 17 is turned clockwise, and the supporting rods 19 are swung in the same direction.

It is preferable that the supporting member 17 has preventing portions 17b which prevent the brake shoes 20 from coming into sliding contact with the inner cylindrical surface 15a of the brake cylinder 15 when the spool 3 is turned, when the supporting rods 19 have been swung through a certain angle. In this embodiment, the preventing portions 17b extend from the flat portion 17a so that the end faces 20a of the brake shoes 20 are in sliding contact with the cylindrical surface; and when each supporting rod 19 is swung 90° from the position indicated by the solid line, the end faces 20a of the brake shoes 20 are brought into sliding contact with the preventing portions 17b as the supporting member 17 turns. As a result, no brake force is applied to the spool.

The foregoing method of adjusting a brake force applied to the spool 3 by shifting the brake shoes may be practiced with the side board 1a removed. Furthermore, since none of the members used for adjustment of the brake force are exposed to the outside, the side board 1a may be formed as a flat surface, which greatly helps the angler to hold the reel. In addition, problems encountered through intrusion of foreign matter, such as fish, slime, sand, and dust sticking to the brake force adjusting members, is eliminated.

Figure 5:
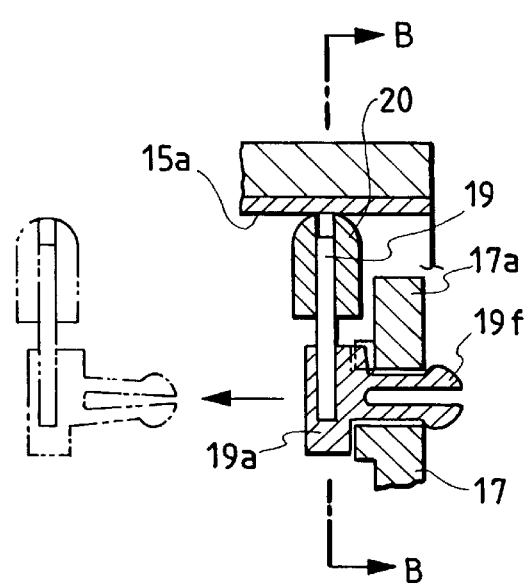
FIG. 5 is a diagram showing one modification of the supporting rod which is swingably supported by a flat portion of a supporting member.
Figure 6:
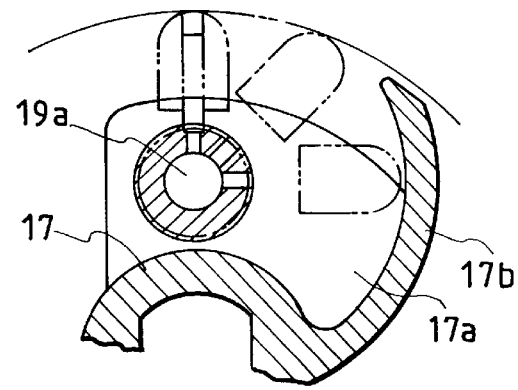
FIG. 6 is a sectional view taken along line B—B in FIG. 5.
Figure 5A:
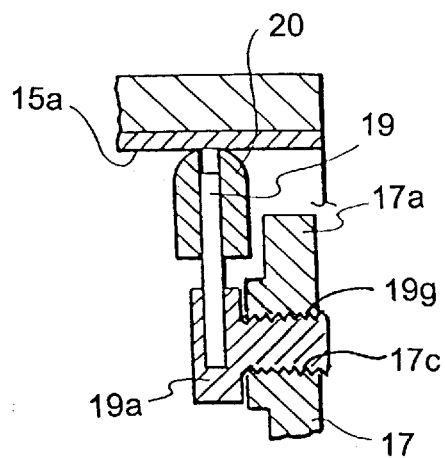
FIG. 5A is a diagram showing another modification of the supporting rod which is swingably supported by a flat portion of a supporting member.

FIGS. 5 and 6 are diagrams showing a modification of the swing means of the supporting rods 19 which are swingably supported on the flat portion 17a of the supporting member 17. Positioning engaging means made up of protrusions and recesses are provided on the front surface of the flat portion 17a and the rear surfaces of the base end portions 19a of the supporting rods 19. An elastic locking portion 19f is extended from each of the base end portions 19a such that it passes through the flat portion 17a. With the elastic locking portion 19f held, the base end portion 19a is pushed in the direction of the arrow. Under this condition, the supporting rod 19 is disengaged and angularly turned (swung) to a desired position. The supporting rod 19 thus turned to the desired position is held engaged with the supporting member; that is, it is fixedly held there. The swing means is not limited to that described above. For instance, threaded members 17c and 19g may be employed, as illustrated in FIG. 5A, so that the position of the supporting rod can be adjusted in a stepless mode.

Figure 7:
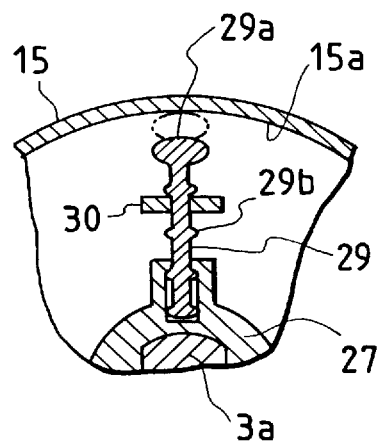
FIG. 7 is a diagram showing a brake rod disengaged from the inner cylindrical surface of a brake cylinder, according to a second embodiment of the invention.
Figure 8:
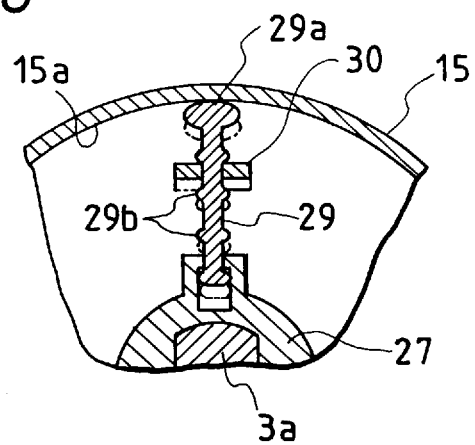
FIG. 8 is a diagram showing the brake surface of the brake rod when brought into sliding contact with the internal cylindrical surface of the brake cylinder, in the second embodiment.
Figure 9:
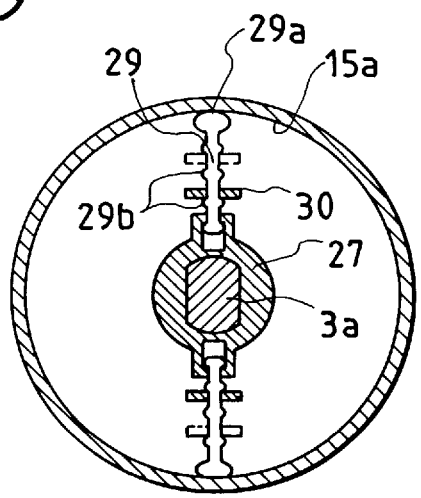
FIG. 9 is a diagram showing the shifting of a weight member mounted on the brake rod in the second embodiment.

Now, a second embodiment of the invention will be described with reference to FIGS. 7 through 9, in which parts corresponding functionally to those already described with reference to the first embodiment are designated by the same reference numerals or characters.

A spool shaft 3a has a supporting member 27. The supporting member 27 is fixedly mounted on the spool shaft 3a so that it turns together with the spool shaft 3a. A brake rod 29 is fitted in the supporting member 27 such that it extends radially from the spool shaft 3a, and is radially slidable on, but cannot come off, the supporting member 27. The end portion of the brake rod 29 has an arcuate brake surface 29a. As the spool shaft 3a turns, centrifugal force moves the brake rod 29, so that the brake surface 29a located as shown in FIG. 7 is moved as shown in FIG. 8; that is, it is brought into sliding contact with the inner cylindrical surface 15a of a brake cylinder 15. The brake rod 29 has locking portions 29b at predetermined intervals. A weight member 30 is locked to a selected one of the locking portions 29b. The weight member 30 is elastically deformable. The elastic deformation of the weight member 30 is utilized to fix the weight member 30 at desired positions as indicated by the dotted lines in FIG. 9.

As described above, the brake rods 29 each extend radially from the spool shaft 31. Therefore, when the weight member 30 is shifted, the distance r from the center is changed. If, in this case, it is assumed that the brake surface 29a applies a centrifugal force F to the inner cylindrical surface 15a, then an expression $F = m\, r\, \omega^2$ is established (where m is the mass of the weight member 30, and $\omega$ is the angular velocity of the supporting member 27). The mass of the weight member 30 is constant. Hence, as the distance r increases, the centrifugal force F applied to the inner cylindrical surface 15a by the brake surface 39 is increased. Hence, by shifting the position of the weight member 30, the brake force applied to the spool can be adjusted.

Figure 10:
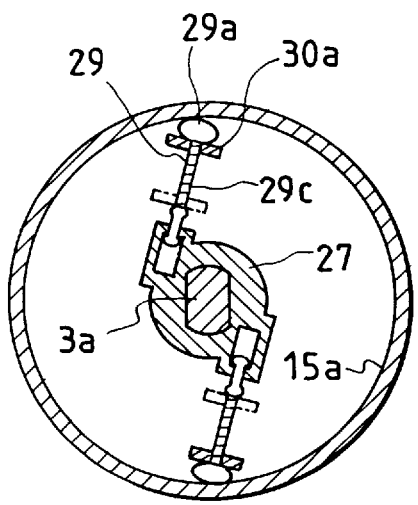
FIG. 10 is a diagram showing one modification of the brake device shown in FIG. 7.

The position of the weight member 30 on the brake rod 29 may be changed by a mechanism as shown in FIG. 10. In this mechanism, the brake rod 39 has a threaded portion 29c engaged with a nut-shaped weight member 30a. Thus, the position of each of the weight members 30 may be changed in a stepless mode; that is, the brake force applied to the spool 3 can be precisely adjusted.

In the above-described embodiment, the brake rods extend radially from the spool shaft 3a; however, the invention is not limited thereto or thereby. As long as a plurality of brake rods 29 are arranged symmetrically with respect to the supporting member 27, the brake rods may be supported in various manners.

Figure 11:
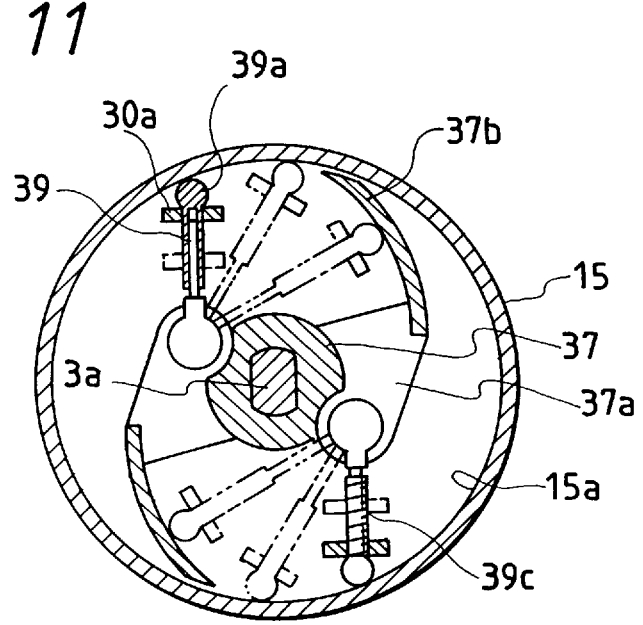
FIG. 11 is a diagram showing a third embodiment of the invention.

FIG. 11 shows another embodiment of the invention, which is obtained by suitably combining the above-described embodiments.

In this embodiment, a supporting member 37 is fixedly mounted on the spool shaft 3a so that the supporting member 37 turns together with the spool shaft 3a. A pair of brake rods 39 are supported on the flat portion 37a of the supporting member 37 such that they are symmetrical with respect to the spool shaft 3a. The brake rods 39 are each swingably supported on the flat portion 37a through swing means such as that shown in FIG. 3 or 5 so their angular position can be changed. The end portion of each of the brake rods 39 has an arcuate brake surface 39a. As the spool shaft 3a turns, the brake surface 39a is brought into sliding contact with the inner cylindrical surface 15a of the brake cylinder 35 depending on the angle of the brake rod 39. The brake rods 39 have threaded portions 39c, with which nut-shaped weight members 30a are threadably engaged, so that the positions of the weight members 30a can be changed smoothly.

Hence, in the reel shown in FIG. 11, the brake force applied to the spool 3 can be adjusted by changing the positions of the weight members 30a and the angular positions of the brake rods 39. That is, the brake force can be precisely adjusted over a wide range.

It is preferable to form preventing portions 37b on the flat portion 37 as shown in FIG. 11 to prevent the brake surfaces 39a of the brake rods 39 from being brought into sliding contact with the inner cylindrical surface 15a, thereby preventing braking action. In this case, as the supporting member 37 turns, the brake surfaces 39a are brought into sliding contact with the preventing portions, so that no brake force is applied to the spool 3.

As described above, the embodiment of the invention shown in FIG. 11 is formed by suitably combining the two previously-described embodiments; however, the invention is not limited thereto or thereby. For instance, instead of forming the end portions of the brake rods 39 as brake surface 39a, brake shoes may be attached to the end portions of the brake rods 39. Alternatively, the brake device may be designed so that the brake rods 39 are swingable and axially slidable, and/or a larger number of brake rods may be arranged on the supporting member.

With the brake device of the invention, operated by centrifugal force, the brake force applied to the spool can be stably adjusted (increased or decreased), so the fishing line can be smoothly and stably let out of the reel. The brake device has no component which may move axially relative to the spool. Hence, it is unnecessary to make the reel body bulky; that is, it is compact. Furthermore, the reel can be securely held by the fisherman during reeling.

What is claimed is:

1. In a fishing reel having a reel body and a spool rotatably supported by said reel body, a brake device comprising:
    a brake cylinder, having an inner cylindrical surface, provided in said reel body;
    a supporting member rotatable with said spool;
    a supporting rod, swingably supported by said supporting member, such that an angular position of said supporting rod relative to said supporting member is changeable;
    a brake shoe, slidably coupled to said supporting rod such that said brake shoe is brought into sliding contact with said inner cylindrical surface of said brake cylinder when said supporting member rotates with said spool.

2. A brake device as claimed in claim 1, wherein said supporting member has preventing portions which prevent said brake shoe from being brought into sliding contact with said inner cylindrical surface of said brake cylinder when said supporting rods are moved to a predetermined angular position relative to said supporting member.

3. A brake device as claimed in claim 1, further comprising positioning engaging means for holding said supporting rod at a desired angular position relative to said supporting member.

4. A brake device as claimed in claim 3, wherein said positioning engaging means comprises a plurality of interlocking protrusions and recesses formed in said supporting rod and said supporting member, and means for urging said protrusions and recesses against each other.

5. A brake device as claimed in claim 4, wherein said means for urging comprises:
    a pin integrated with said supporting rod and extending through an opening in said supporting member; and a spring resiliently interposed between said pin and said supporting member.

6. A brake device as claimed in claim 4, wherein said means for urging comprises:

a resilient, knobbed projection integrated with said supporting rod and extending through an opening in said supporting member.

7. A brake device as claimed in claim 3, wherein said positioning engaging means comprises a pair of threaded members formed in said supporting rod and said supporting member.

8. A brake device as claimed in claim 3, wherein said positioning engaging means are provided exclusively on said supporting member and said supporting rod, and are rotatable with said spool.

9. A brake device as claimed in claim 3, wherein said positioning engaging means comprise recesses for securing said supporting rod selectively in one of a plurality of predetermined, fixed angular positions relative to said supporting member, each position corresponding to a different level of braking force.

* * * * *